United States Patent [19]

Shedigian

[11] Patent Number: 4,538,207

[45] Date of Patent: Aug. 27, 1985

[54] DIELECTRIC FLUID FOR A CAPACITOR

[75] Inventor: Vandos Shedigian, Indianapolis, Ind.

[73] Assignee: Emhart Industries, Inc., Indianapolis, Ind.

[21] Appl. No.: 594,877

[22] Filed: Mar. 29, 1984

[51] Int. Cl.³ .............................................. H01G 4/22
[52] U.S. Cl. .................... 361/317; 252/579; 585/6.3
[58] Field of Search ........................ 252/579; 361/317; 585/6.3

[56] References Cited

U.S. PATENT DOCUMENTS

| | | | |
|---|---|---|---|
| 4,081,393 | 3/1978 | Berthelot et al. | 585/6.3 |
| 4,115,834 | 9/1978 | Robinson et al. | 252/579 |
| 4,142,983 | 3/1979 | Jay et al. | 252/579 |
| 4,276,184 | 6/1981 | Mandelcorn et al. | 252/579 |

FOREIGN PATENT DOCUMENTS

| | | |
|---|---|---|
| 3133559 | 3/1983 | Fed. Rep. of Germany . |
| 49-39797 | 4/1974 | Japan .................................. 252/579 |
| 50-41099 | 4/1975 | Japan . |
| 50-41100 | 4/1975 | Japan . |

*Primary Examiner*—Paul Lieberman
*Assistant Examiner*—Robert A. Wax
*Attorney, Agent, or Firm*—Robert F. Meyer

[57] ABSTRACT

The gas absorption ability of a phthalate ester is improved by the addition of an alkylated benzene with 18 carbons outside the benzene ring. This also improves the swellability of polypropylene film capacitors.

4 Claims, 3 Drawing Figures

DIELECTRIC FLUID FOR A CAPACITOR

BACKGROUND OF THE INVENTION

The present invention generally relates to dielectric fluids used in capacitors and, in particular, to such fluids which include dioctyl phthalate.

Capacitor manufacturers usually produce many kinds of capacitors from different solid dielectrics For many years, polychlorinated biphenyls (PCB's) were used as an impregnant in the majority of capacitors due to its high dielectric constant, low dissipation factor, stability and no fire point. However, since PCB was banned by the U.S. government due to environmental, ecological and health hazards, many newly developed types of dielectric fluids are used in capacitors. For example, recently semi-aromatic/aliphatic esters (predominantly aliphatic) such as diisononyl phthalate (DINP), dioctyl phthalate (DOP) and others gained popularity as replacements for PCB.

Desirable properties for this fluid are: biodegradability, high dielectric constant, ease of refining, stability, high flash point, good gas absorber, and the ability to swell polypropylene film.

The present invention is directed to the provision of a dielectric fluid of an aliphatic ester that is a good gas absorber. A good gas absorber is needed in capacitor impregnants to prevent the cumulative effect of partial discharges producing a gas, and eventually leading to capacitor failure. The relative gassing rates of the capacitor impregnant should have a bearing on the corona start voltage, the corona extinguish voltage, and on capacitor life. Most gas being generated is likely to be a high "hot spot" area and improved gas absorption of impregnant is very desirable.

The dielectric fluid of the present invention also improves the swellability of polypropylene film capacitors. The advantages of swelling polymeric film is to reduce the space between the dielectric (film) and electrode and therefore increasing the intrinsic dielectric strength of the fluid. The swelling also restricts the movement of impurities resulting in low heat dissipation.

SUMMARY OF THE INVENTION

Accordingly, the present invention provides a dielectric fluid for paper and paper-film capacitors including a mixture of a phthalate ester and a compound of a highly branched alkylated benzene with 18 carbons outside the benzene ring.

BRIEF DESCRIPTION OF THE DRAWINGS

The present invention is illustratively described in respect to the appended drawings in which.

DETAILED DESCRIPTION OF THE DRAWINGS

Figure 1:
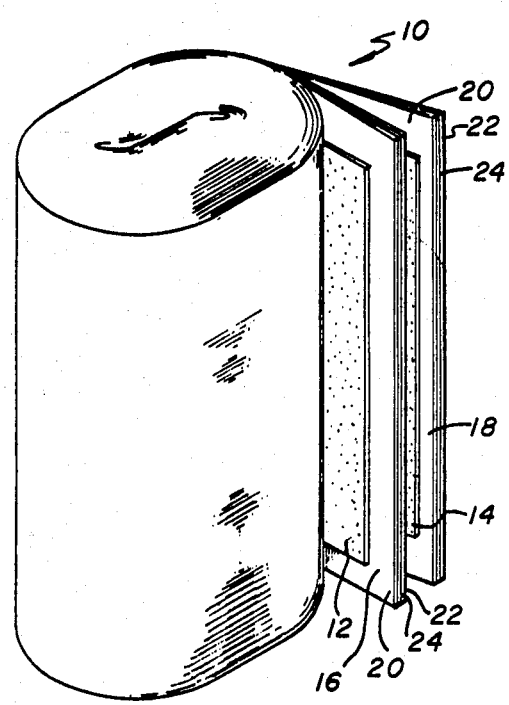
FIG. 1 is a perspective view of the electrode-dielectric body of a convolutely wound capacitor constructed according to an embodiment of the present invention.

FIG. 1 shows the convolutely wound electrodes of a high voltage dielectric capacitor constructed according to one embodiment of the present invention. The capacitor body 10 includes a pair of electrodes 12 and 14 which are separated by a pair of dielectric separators 16 and 18. The electrodes 12 and 14 may be made of any suitable electrically conductive metal such as aluminum. The dielectric means, or separators 16 and 18, used in high voltage capacitors and for the present invention each includes a pair of sheets of plastic film 20 and 22 which are separated by a sheet of paper 24. The plastic film is typically a polymeric film which may be selected from the group consisting of polypropylene, polyethylene, polyester, polycarbonate, polystyrene, polysulfone and polyethylene terephthalate. Other suitable arrangements may also be used in place of that of the present invention. Such arrangements might include the same materials but different combinations of dielectric sheets. Examples are a combination of single sheets of paper and plastic film or the combination of two sheets of paper and a single sheet of plastic film.

Figure 2:
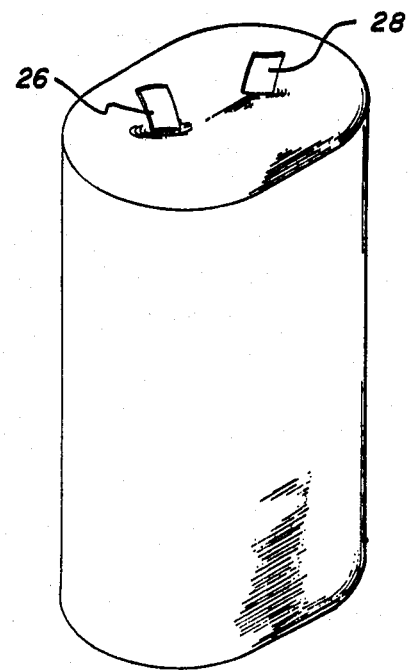
FIG. 2 is a perspective view of the embodiment of FIG. 1 wherein the coils are completely wound and electrical leads are attached to the electrodes.

FIG. 2 shows the electrode body 10 of FIG. 1 with the electrodes completely wound and with a pair of electrical leads 26 and 28, each of which is connected to a separate electrode such as 12 and 14, respectively. The leads 26 and 28 may be made of any suitable material such as solder coated copper.

Figure 3:
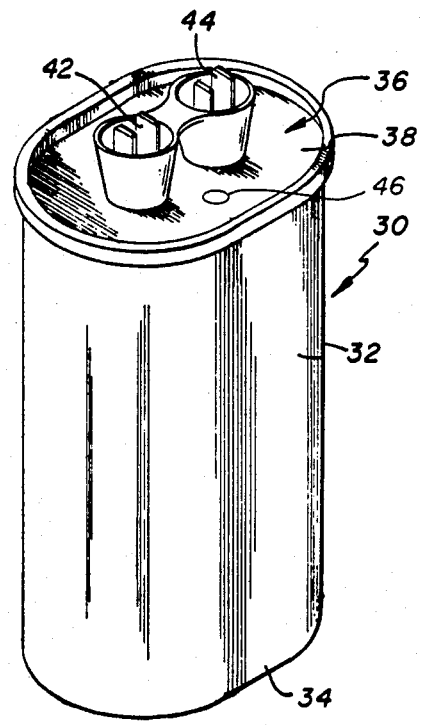
FIG. 3 is a perspective view of the embodiments of FIGS. 1 and 2 after being packaged in a suitable capacitor casing.

FIG. 3 shows a completed capacitor 30 having a housing or can 32 enclosing the electrode body 10. The housing 32 has a closed end 34 and an open end 36 through which the capacitor body 10 is inserted during menufacturing. A cover 38 encloses the end 36 and includes a pair of electrical terminals 42 and 44 which are connected to the leads 26 and 28, respectively, from the electrodes 12 and 14. Any suitable material may be used for the housing 32 and cover 36, such as aluminum, with proper precautions being taken to prevent shorting of either the electrodes 12, 14, leads 26, 28 or terminals 42, 44 thereto.

In the manufacturing of the capacitor 10, electrodes 12 and 14, with electrical leads 26 and 28, are first assembled with the dielectric means or separators 16 and 18 in a stacked fashion. The stack is then rolled to form the capacitor body shown in FIG. 2, and the body is inserted into a housing 34. At this point, the electrical leads 26 and 28 are connected to terminals 42 and 44 on the cover 38. The cover 38 is then attached to the housing 32 and sealed by any suitable means such as welding. The cover 38 also includes an opening or hole 46 to allow the ingress and egress of gasses and liquids. The housing 34 is then placed in a vacuum oven and heat dried for an extended period of time which in most cases would probably be a minimum of at least eight hours. This is needed to drive contaminants such as water from the capacitor body. At this point in the manufacturing process, a dielectric fluid is added under vacuum.

The dielectric fluid which is added and which concerns the present invention is a mixture of a phthalate ester and an alkylated benzene. The phthalate ester is 2-ethyl-hexyl phthalate or dioctyl phthalate or DOP. The preferred form of alkylated benzene is an alkylated benzene with 18 carbons outside the benzene ring. It is sold as Dichevrol 100 and 150 (hereinafter DL) by Chevron Chemical Co. Dichevrol 100 and 150 is a branched chain of alkylbenzene with the following homolog distribution: about 70% monoalkyl (C15–C24) benzenes, about 30% dialkyl (C3–C9) benzenes, and traces of trialkyl (C12–C18) benzenes. Mono, di, and trialkyls are all branched. Dichevrol 150 has a higher viscosity than Dichevrol 100. DL should be included in the dielectric fluid in an amount between 10 and 20% by volume. The preferred ratio by volume is 20% DL to 80% dioctyl phthalate. This mixture results in dielectric fluid having a practical dielectric constant for volumetric efficiency and improves the gas absorption ability of the phthalate ester. Also, the addition of DL to DOP improves the swellability of the polypropylene film.

A minor amount of epoxide is added to the fluid as a stabilizer and a minor amount of butylated hydroxytoluene is added as an antioxidant.

After blending, the dielectric fluid is refined to remove water and ionic impurities by passing it through a chromatographic column using aluminum oxide or Fuller's earth or layers of both and placed in a vacuum oven for drying. The refined fluid is then introduced into the capacitor shown in FIG. 3 under heat and pressure by submerging the capacitor in the fluid in an evacuated oven. Repetitive pressurizations of the oven to atmospheric pressure and reestablishment of the vacuum can be used to force the dielectric fluid into the capacitor body and its plastic dielectric film. The hole 46 is then typically sealed with solder to complete the manufacturing process.

Table I below clearly shows the improved absorption properties of DL as opposed to DOP and a linear alkylated benzene with 12 carbons outside the benzene ring.

Table II shows the fluid properties of DOP and DL alone and in combination at the preferred ratio. Note that in Table II there is a very small drop in the dielectric constant between DOP and the preferred ratio while there is a large drop in the dissipation factor (DF) between the two.

Table III shows the increased swellability of the DL additive.

TABLE I

GASSING CHARACTERISTICS OF DIELECTRIC FLUID UNDER ELECTRICAL STRESS PIRELLI CELL-HYDROGEN
(Measuring Instrument)

| FLUIDS | GAS ABSORBTION @ 80° C. MICROLITERS/MIN. |
|---|---|
| Mineral Oil | +9 |
| Aroclor 1242 (PCB) | −4.6 |
| Dioctyl Phthalata (DOP) | −3.0 |
| Dodecylbenzene-12 Carbons (Linear Alkylated Benzene) | −12.0 |
| Dichevrol 100-18 Carbons (Branched Alkylated Benzene) | −46 |
| Dichevrol 150 | −42 |

(+)-Evolving and (−)-Absorbing gas.

TABLE II

PHYSICAL AND ELECTRICAL PROPERTIES

| | FLUIDS | | |
|---|---|---|---|
| | DOP | DICHEVROL 100 | 80 Vol. % DOP + 20 Vol. % DICHEVROL 100 |
| Viscosity, CS - 25° C. | 65 | 31 | 55 |
| - 100° C. | 4.2 | 2.9 | 3.8 |
| Specific Gravity - 25° C. | 0.982 | 0.862 | 0.958 |
| - 100° C. | 0.928 | 0.814 | 0.906 |
| Dielectric Constant - 25° C. | 5.1 | 2.2 | 4.5 |
| - 100° C. | 4.3 | 2.1 | 3.8 |
| % DF, 100 Hz, 100° C. | 16 | 0.01 | 5.3 |
| Acidity, MGKOH/Gr Oil | 0.009 | 0.003 | 0.005 |

MGKOH = miligram of potassium hydroxide.

TABLE III

% SWELLABILITY OF POLYPROPYLENE FILM

| DOP | | | DICHEVROL 100 | | | 80 Vol. % DOP + 20 Vol. % DICHEVROL 100 | | |
|---|---|---|---|---|---|---|---|---|
| 25 | 60 | 95° C. | 25 | 60 | 95° C. | 25 | 60 | 95° C. |
| 0.4 | 4.0 | 7.1 | 3.6 | 12.7 | 15.4 | 1.7 | 6.1 | 8.1 |

What is claimed is:

1. In a paper, paper-film capacitor, a dielectric fluid including a mixture of dioctyl phthalate and branched alkylated benzene with 18 carbons outside the benzene ring.

2. The capacitor of claim 1, wherein said branched alkylated benzene includes a branched chain alkylbenzene with the following homolog distribution: about 70% monoalkyl (C15–C24) benzenes, about 30% diakyl (C3–C9) benzenes, and traces of trialkyl (C12–C18) benzenes.

3. The capacitor of claim 2 wherein said dioctyl phthalate and said branched alkylated benzene are included in a percent by volume mixture of substantially 80 and 20, respectively.

4. The capacitor of claim 3, wherein said film is selected from the group consisting of polypropylene, polyethylene, polyester, polycarbonate, polystyrene, polysulfone and polyethylene terephthalate.

* * * * *